United States Patent [19]

McLaren

[11] 3,752,321
[45] Aug. 14, 1973

[54] PLEAT DEFORMATION CONTROL FOR PLEATED FLUID TREATMENT MEDIA

[75] Inventor: James C. McLaren, Racine, Wis.

[73] Assignee: Tenneco Inc., Racine, Wis.

[22] Filed: June 3, 1971

[21] Appl. No.: 149,508

[52] U.S. Cl.................................. 210/493, 210/497
[51] Int. Cl............................................ B01d 27/06
[58] Field of Search.................... 55/478; 210/437, 210/484, 487, 493, 497, 506

[56] References Cited
UNITED STATES PATENTS

| | | | |
|---|---|---|---|
| 3,692,184 | 9/1972 | Miller, Jr. et al. | 210/493 X |
| 3,246,765 | 4/1966 | Murphy et al. | 210/493 X |
| 3,189,179 | 6/1965 | McMichael | 210/493 X |
| 3,241,680 | 3/1966 | Humbert, Jr. | 210/484 |

Primary Examiner—Samih N. Zaharna
Assistant Examiner—Richard W. Burks
Attorney—Thomas E. Torphy

[57] ABSTRACT

A continuous ribbon or fillet of an adhesive plastic, such as a hot melt adhesive, epoxy, or plastisol, adhered to selected areas of the internal surfaces and terminations of the pleats of an annular, inside-out flow longitudinally pleated fluid treatment medium, such as a fluid filter or coalescer medium, prevents pleat deformation and consequent "pinch-off" or blockage of the pleats when the medium is subjected to fluid pressure during use.

6 Claims, 6 Drawing Figures

Patented Aug. 14, 1973 3,752,321

PLEAT DEFORMATION CONTROL FOR PLEATED FLUID TREATMENT MEDIA

BACKGROUND OF THE INVENTION

This invention relates to a means to maintain the pleats of a pleated fluid treatment medium assembled into an inside-out flow fluid treatment unit in a desired position to assure optimum performance of the fluid treatment unit during use.

Known prior art means for controlling the deformation of the pleats of pleated fluid treatment media, such as pleated oil filter media and the like, have generally been applied to those fluid treatment media placed in units in which the flow of fluid is from the outer surfaces of the annular element to the inside. Referring specifically to oil filters, such filter elements are commonly known as outside-in flow filter elements.

Outside-in flow filter elements generally consist of an annulus of longitudinally pleated paper, which is the filter medium, having its inner circumference supported by a perforated metal tube, commonly called the center tube. The outer circumference of the annular medium is often surrounded by a perforated cylinder, also. This cylinder is commonly called the outer shell. Each end of the annular medium and concentric inner and outer shell assembly is sealed by a disc or cap, known to those skilled in the filter art as an end cap. At least one end cap has an opening in it to provide an outlet for fluid which flows from the outside to the inside of the filter element.

One prior art pleat deformation control means consists of bands of paper or lengths of string adhered to the external terminations or roots of the pleats at selected locations along the outer circumference of the medium. Such pleat deformation control means are shown in U.S. Pat. Nos. 3,306,794 and 3,241,680 respectively.

A second prior art pleat deformation control means consists of placement of corrugated bands of relatively stiff paper adjacent the outer circumferential terminations and selected surface areas of the pleats and adhered thereto or to the inner circumferential surface of the outer shell. Such means are shown in U.S. Pat. Nos. 3,310,177 and 3,368,687.

It is known that extrusions of thermoplastic or thermosetting materials can be applied as shown in U.S. Pat. No. 3,189,179 to pleated paper filter media to maintain the pleats in a desired position. However, such known extrusions are only applied to the paper subsequent to its being pleated and prior to its being formed into an annulus. This method requires that the pleated paper medium be maintained at a desired length during the of th4e pleat deformation control ribbons or fillets onto the paper. The paper medium with the extrusions thereon is then passed through an oven to effect curing and consequent substantial solidification of the extruded ribbons of pleat deformation control material. The pleated paper medium is then formed into an annulus for assembly into a filter element.

This latter prior art method of applying such extrusions prior to formation of the pleated paper medium into an annulus is cumbersome and expensive. Use of other prior art means, such as supplemental corrugated bands, also is cumbersome and expensive as such prior art pleat deformation control means require additional time consuming labor and/or additional, relatively costly materials.

SUMMARY OF THIS INVENTION

This invention relates to a ribbon or fillet of a plastic which serves as a pleat deformation controls means for annular pleated fluid treatment media.

As used herein "plastic" is defined as a substance that at some stage in its manufacture or processing can be shaped by flow (as by application of heat or pressure) with or without fillers, plasticizers, reinforcing agents, or other compounding ingredients and that can retain the new solid often rigid shape under CONDITIONS of use.

DETAILED DESCRIPTION OF THE INVENTION

Figure 1:
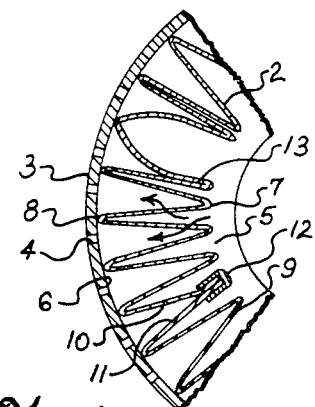
FIG. 1 is a segmented axial cross-sectional view normal to the longitudinal axis of a typical inside-out flow pleated fluid treatment medium surrounded by a cylindrical outer shell. The pleated fluid treatment media shown in this figure lacks pleat deformation control means and a consequent typical pleat "pinch-off" condition is illustrated.

In FIG. 1 only a portion of a cross-section normal to the longitudinal axis of a typical inside-out flow fluid treatment unit or element is shown. An annulus of pleated fluid treatment medium 2 is placed within and surrounded by an outer metallic cylinder or shell 3 having fluid flow perforations or openings 4. Each end of such a cylindrical element is sealed by an end cap.

The annulus of pleated fluid treatment medium, in FIG. 1 is a coalescing medium, 2 has an inner circumference 5 and an outer circumference 6 generally defined by internal pleat terminations 7 and external pleat terminations 8 respectively. The terminations are connected by a series of integral pleat legs 9. The pleated medium 2 is formed by pleating strips of sheet materials, such as paper, on conventional well known pleaters, then cutting the strips of desired length and forming the strips into an annulus and maintaining them in annular form by placing the two ends 10 and 11 of the strip together and sealingly securing them with a means, such as clip 12.

When a coalescing element such as that shown in FIG. 1 is placed in service in a suitable apparatus, not shown, the fluid flows through the medium as indicated by arrows. When the medium is subjected to a differential pressure due to the restriction to flow of the medium, the pleats have a tendency to deform. Stiffening of media, such as paper by impregnation or coating with resins has traditionally been used to decrease such deformation. However, the degree of stiffening obtainable is often not sufficient to withstand the pressure differential and the legs 9 of the medium consequently are forced into contact with each other as shown at 13. Therefore, the pleats become substantially pinched off or blocked and the resistance to flow of such pleats is markedly increased. This is a highly undesirable condition as it increased the resistance to flow of the entire medium which increases the pressure differential across the medium. Consequently, other pleats in the medium tend to be deformed and pinched off also. In severe cases the resistance to flow of the entire medium can become so large that the entire medium becomes substantially impervious to fluid flow, thus rendering the unit inoperative. Also, due to the greatly increased pressure differential across the medium, the medium may burst, thus rendering the unit inoperative.

Figure 2:
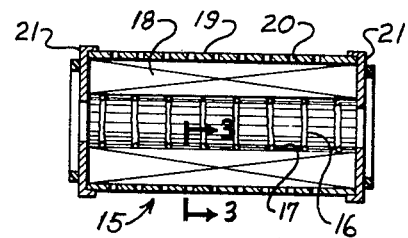
FIG. 2 is a longitudinal cross-sectioanl view of a typical fluid treatment unit or element having pleat deformation control ribbons or fillets of this invention applied to it

FIG. 2 shows a longitudinal cross-sectional view of an assembled coalescing element 15 in which a series of annular pleat deformation control ribbons or fillets 16 have been applied to the internal pleat terminations 17 of the annular pleated medium 18. The annular medium is surrounded and supported by cylindircal outer shell 19 having perforations or fluid flow openings 20 therein. Each end of the cylindrical medium and outer shell assembly is enclosed by an end cap 21. At least one of the end caps 21, and frequently both as shown herein, have an opening 22 to enable the fluid to be treated to flow into the interior of the element.

Figure 3:
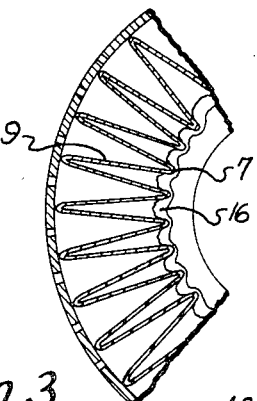
FIG. 3 is a segmented cross-sectional view taken on line 3—3 of FIG. 2.

FIG. 3 shows a segmented axial cross-section of the coalescing element of FIG. 2 as indicated by the section lines. In FIG. 3 a pleat deformation control ribbon 16 is shown adhered to the inner pleat terminations 7 and respective adjacent surfaces of each pleat leg 9. It will be seen that the substantially rigid ribbon 16 of a cured plastic adhesive will prevent any of the inner pleat terminations 7 from being forced into contact with an adjacent pleat termination of the filter. It has been found that incremental placement of such annular bands of pleat deformation ribbons 16 along the longitudinal length of a medium 18 assembled into a element 15 provides adequate pleat deformation control and consequently protects against pleat pinch-off.

Figure 4:
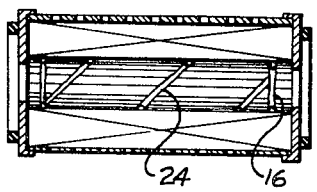
FIG. 4 is a longitudinal cross-sectional view of a typical fluid treatment unit or element having pleat deformation control ribbons or fillets of this invention applied in an alternate spiral configuration.

FIG. 4 shows a coalescing element identical to the element 15 shown in FIG. 2 in which a pleat deformation control ribbon or fillet 24 has been extruded onto the internal terminations of the pleats of the pleated medium in a helical or spiral configuration terminating in an annular band 16 near each end of the medium.

Figure 5:
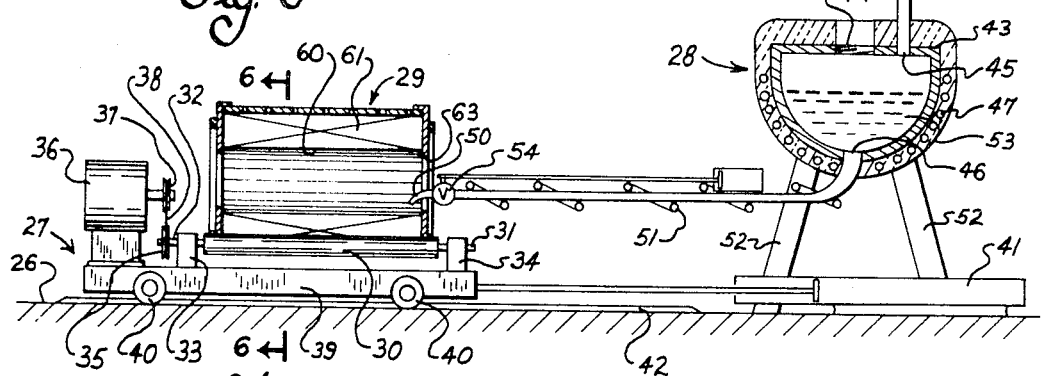
FIG. 5 shows typical apparatus used to apply the pleat deformation control ribbons or fillets of this invention.

FIG. 5 shows an assembled element 29 similar to the element 15 of FIG. 2 in relation to one suitable set of apparatus used to practice the herein disclosed method of applying extruded pleat deformation control ribbons or fillets to a pleated medium.

The apparatus rests on a base surface 26 and consists of element movement means 27 and adhesive material heating and extrusion means 28.

Figure 6:
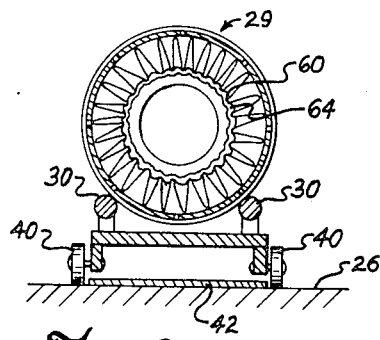
FIG. 6 is a cross-sectional view taken on line 6—6 of FIG. 5.

The element 29 is placed upon means suitable to rotate the element about its axis, such as element support rolls 30 of which only one is shown in FIG. 5 and two are shown in FIG. 6. Each of the support rolls 30 is supported at each of its ends by a shaft 31 and 32 that turns within suitable bearing means, not shown, provided in roll support means 33 and 34. A drive means, such as sheave 35 is rigidly affixed to at least one of the rolls 30 and is suitably connected to a rotary motion power source, such as variable speed electric motor 36, which is connected to driven sheave 35 by driving sheave 37 and drive belt 38.

Roll support means 33 and 34 and the rotary power source means are mounted on a surface 39 capable of movement parallel to the axis of filter element 15. It will be seen that surface 39 is supported above base surface 26 by support rolls 40.

A linear motion power source, such as double acting hydraulic cylinder 21, is connected to element movement means 27 and moves means 27, with suitable controls, along surface 26 in a direction parallel to the axis of the element 29. Guide means, such as raised guide way 42 may be provided to assure proper longitudinal movement of movement means 27. It will be readily seen that element support means 27 could be maintained stationary and nozzle 50 could be rendered capable of movement parallel to the longitudinal axis of the filter element, such as by provision of a telescoping conduit 51 or by arranging for suitable movement of material heating and extrusion means 28.

Adhesive material heating and extrusion means 28 is comprised of adhesive reservoir 43 having sealable opening 44, an air inlet 45 and adhesive outlet 46. The reservoir is provided with heating means, such as an induction heating coil 47 so the contents of the reservoir can be maintained at a desired temperature. Air inlet 45 is connected to a source of comprssed air by conduit 48.

Adhesive outlet opening 46 is sealingly engaged with an adhesive outlet conduit 49 which contains at least one extrusion nozzle 50. Adhesive outlet conduit 49 is also preferably provided with a means, such as an induction heating coil 51, to heat its contents.

Adhesive reservoir 43 is suitably maintained in a fixed position relative to filter element 29 by means such as support legs 52.

To practice the method of this invention a heat softening adhesive 53 is maintained at a desired viscosity in the reservoir 43 by proper control of heating means 47. The adhesive is maintained under substantially constant pressure by a suitable regulated source of compressed air admitted to the reservoir through conduit 48 and opening 45.

The pressure of the compressed air forces the adhesive through opening 46, conduit 49 and out nozzle 50. Suitable flow control means, such as a valve 54, is preferably provided to enable accurate regulation and rapid commencement and termination of flow from the nozzle.

To place annular bands such as those shown in FIG. 2 of a pleat deformation ribbon or fillet about the internal terminations 60 of the medium 61 in element 29, linear motion means 41 moves the element 29 and element movement means 27 so that the fixed position nozzle 50, is inserted into the interior of the element 29 through opening 63 in the end cap of the element. When the nozzle 50 is adjacent the location where it is desired to place the annular band of pleat deformation control ribbon or fillet the element 29 is rotated about its axis upon support rolls 30 by means previously described. Valve 54 is then opened to permit adhesive to be extruded from nozzle 50. Due to gravity the adhesive is deposited in a continuous ribbon onto the internal terminations of the filter medium in element 29 and as the element 29 is rotating a continuous annular band of the adhesive ribbon 64 of FIG. 6 is deposited onto those areas of the internal terminations of the medium which pass beneath the nozzle during rotation of the element. Upon a complete revolution of the element 29 the flow from the nozzle may be stopped by closing valve 54. Longitudinal movement means 41 moves the rotating element 29 relative to the nozzle 50 to a next desired location for an annular band of pleat deformation control ribbon and the operation is repeated. A plurality of nozzles may be used for simultaneous placement of a plurality of annular beads upon the filter element.

To place a spirally configured ribbon onto the medium's inner pleat terminations, the element 29 is simultaneously moved longitudinally and rotated about its axis while a ribbon of adhesive is extruded from the nozzle 50.

General criteria for suitable materials which may be used to practice the invention herein disclosed are: (1) it must be a plastic substance, i.e. a substance that at some stage in its manufacture or processing can be shaped by flow, as by application of heat or pressure, with or without fillers, plasticizers, reinforcing agents, or other compounding ingredients and that can retain its new substantially solid shape under conditions of use; (2) it must wet and adhere to the fluid treatment medium; (3) it must have sufficient cured strength to maintain the pleats in the desired psition relative to EACH other; (4) it must not deteriorate when subjected to the fluid being treated or at the temperatures to which the medium is subjected in use; (5) it must be capable of being rendered sufficiently fluid to enable it to readily flow from the nozzle, but it must also be sufficiently thixotropic so it maintains the position in which it is deposited upon the medium, despite substantially continual rotation of the element during application of the material.

It will be readily apparent to those skilled in the art that a great variety of plastic adhesives, such as thermoplastic adhesives, thermosetting adhesives, hot melt adhesives, plastisols, epoxies, and the like, will be suitable to practice the method and obtain the pleat deformation control means of this invention.

One representative suitable hot melt plastic adhesive is Ward and Kennedy Company's No. 502 Hot Melt. This adhesive is maintained in the reservoir at temperatures within the range of 320° – 325° F. Additionally the hot melt contained within the outlet conduit 49 upstream of valve 54 is preferably maintained at a temperature of 410° – 425° F. The pressure on the adhesive in the reservoir is maintained at 50 – 60 psi. Maintaining the above variables within the ranges mentioned and rotating the element at 5 – 6 rpm provides a desired pleat deformation control means as herein disclosed.

Another representative suitable plastic adhesive is Co-Polymer Chemical Incorporated's EA 20–55 two component, filled epoxy. This epoxy is non-thixotropic. Its two components are mixed together in equal volumes in a conventional mixing head placed upstream of the nozzle. One reservoir is required for each component of the epoxy and pump means, such as conventional positive displacement pumps, which will provide a controlled amount of each component from the reservoir to the mixing head are required. Neither the reservoirs nor the conduits connecting the reservoirs to the mixing head need be heated.

It is preferable to pre-heat the medium upon which this epoxy is to be placed to a temperature in the range of 325° – 375° F. prior to extruding the ribbon or fillet of epoxy onto it. Such pre-heating of the medium lowers the viscosity of the epoxy and causes it to more readily flow between adjacent pleat legs.

Cure of this epoxy may be accelerated by heating in an oven after application, if desired.

I claim:

1. In a fluid treatment element having an annulus of longitudinally pleated fluid treatment medium surrounded by a perforate cylindrical outer shell and having an end cap at each end of the assembly, at least one of said end caps having a flow opening communicating with the space defined by the inner circumference of the annulus of pleated medium, an improved pleat deformation control means comprising:

a continuous fillet of a rigid plastic adhered to the inner pleat terminations defining the inner circumference of the annular pleated medium.

2. The improved pleat deformation control means as defined in claim 1 in which said continuous fillet of plastic defines an annular band with respect to the longitudinal axis of the fluid treatment element.

3. The improved pleat deformation control means as defined in claim 1 in which said continuous fillet of plastic defines a helix with respect to the longitudinal axis of the fluid treatment element.

4. The improved pleat deformation control means as defined in claim 3 in which said helix formed from said continuous fillet of plastic terminates in an annular band near each end of said fluid treatment element.

5. In a fluid treatment element having an annulus of longitudinally pleated fluid treatment medium surrounded by a perforate cylindrical outer shell and having an end cap at each end of the assembly, at least one of said end caps having a flow opening communicating with the space defined by the inner circumference of the annulus of pleated medium, an improved pleat deformation control means comprising:

a continuous fillet of a hot melt adhesive adhered to the inner pleat terminations defining the inner circumference of the annular pleated medium.

6. In a fluid treatment element having an annulus of longitudinally pleated fluid treatment medium surrounded by a perforate cylindrical outer shell and having an end cap at each end of the assembly, at least one of said end caps having a flow opening communicating with the space defined by the inner circumference of the annulus of pleated medium, an improved pleat deformation control means comprising:

a continuous fillet of an epoxy adhered to the inner pleat terminations defining the inner circumference of the annular pleated medium.

* * * * *

UNITED STATES PATENT OFFICE
CERTIFICATE OF CORRECTION

Patent No. 3,752,321      Dated August 14, 1973

Inventor(s) James C. McLaren

It is certified that error appears in the above-identified patent and that said Letters Patent are hereby corrected as shown below:

Column 1, line 54, change "the of th4e" to
-- extrusion of the -- .

Column 2, lines 13 and 14, change "CONDITIONS" to -- conditions -- ;
line 16, cancel "5";
line 24, change "cross-sectioanl" to -- cross-sectional -- ;

line 49, cancel "is";
line 56, change "of" to -- to -- .

Column 3, line 24, change "cylindircal" to -- cylindrical -- .

Column 4, line 29, change "comprssed" to -- compressed -- .

Column 5, line 28, change "psition" to -- position -- ;
line 29, change "EACH" to -- each -- .

Signed and sealed this 22nd day of January 1974.

(SEAL)
Attest:

EDWARD M. FLETCHER, JR.
Attesting Officer

RENE D. TEGTMEYER
Acting Commissioner of Patents